United States Patent [19]

Griffioen et al.

[11] Patent Number: 4,850,569

[45] Date of Patent: Jul. 25, 1989

[54] METHOD FOR INTRODUCING A CABLE INTO A CABLE GUIDE TUBE

[75] Inventors: Willem Griffioen, Ter Aar; Cornelis L. De Jong, Alphen Aan Den Rijn, both of Netherlands

[73] Assignee: Staat Der Nederlanden (Staatsbedrijf Der Posterijen, Telegrafie En Telefonie), The Hague, Netherlands

[21] Appl. No.: 184,020

[22] Filed: Apr. 20, 1988

[30] Foreign Application Priority Data

Apr. 28, 1987 [NL] Netherlands .......................... 8701002

[51] Int. Cl.$^4$ .............................................. B66F 3/24
[52] U.S. Cl. .................................................. 254/134.4
[58] Field of Search ............... 254/134.3 FT, 134.3 R, 254/134.3 PA, 134.4; 184/15 R; 15/104.3 JN

[56] References Cited

U.S. PATENT DOCUMENTS 4,655,432 4/1987 Woodruff .................. 254/134.3 FT
4,691,896 9/1987 Reeve et al. .................... 254/134.4

FOREIGN PATENT DOCUMENTS 0108590 5/1984 European Pat. Off. .
0152720 8/1985 European Pat. Off. .
3220286 12/1983 Fed. Rep. of Germany .
2157019 10/1985 United Kingdom .

OTHER PUBLICATIONS

IEEE Journal on Selected Areas in Communications, vol. SAC-4, No. 5, Aug. 1986, IEEE (New York, U.S.), S. Hornung et al: "The Blown Fiber Cable"-pp. 679–685.

Primary Examiner—Robert C. Watson
Attorney, Agent, or Firm—Frishauf, Holtz, Goodman & Woodward

[57] ABSTRACT

A method for installing a cable, more in particular a glass fibre cable, into a duct of a channelization system, the consideration which has led to this being based on the fact that the dragging working, considered from the cable inlet end, as caused by a flow of compressed gas effected in a relevant duct portion will increase according to a non-constant function and, dependent on the geometry and the length of the duct portion, can be insufficient over the initial part of it to compensate the friction forces exerted on the cable locally. According to the invention it has now been suggested to fulfill such a compensation function by exerting on the cable a pushing force working extending to the point where the dragging working will be sufficient to compensate the friction forces.

3 Claims, 3 Drawing Sheets

METHOD FOR INTRODUCING A CABLE INTO A CABLE GUIDE TUBE

BACKGROUND OF THE INVENTION

1. Field of the invention

The invention generally relates to a method and device for introducing (installing) cables, such as e.g. optical glass fibre cables, into a channelization system of guide tubes, in general designated as "ducts", which are disposed, as a rule in the ground, according to a predetermined arrangement.

2. State of the art

According to a usual technique cables are installed by utilizing tensile force. The course of the required tensile force, which has to remain smaller than a permissible value in connection with the mechanical properties of the cable, depends on the geometry of the channelization system (in which as a rule curves and/or windings occur), on the friction forces between the cable and the duct, and on the properties of the cable. Without taking into account the stiffness of the cable the following items are of importance for the required tensile force: the friction forces consequent on the mass of the cable, and the friction forces caused by the tensile stress occurring in the cable (in connection with the curves and/or windings of a relevant duct portion). The former friction forces give rise to a tensile force which increases linearly with the length of cable installed. The latter friction forces give rise to a tensile force which increases exponentially with the number of curves or windings. This imposes an important restriction on the maximum cable length which can be installed in one go. Because of the exponential increase of the required tensile force it can be tried to see to it that the cable tension will be as low as possible. This involves that the friction forces caused by the mass of the cable have to be compensated locally. This means that the installation force has to be exerted divided over the whole length of a cable section to be installed. In a method serving for that purpose a flow of compressed gas (compressed air) is effected from the inlet end of a relevant duct and directed to the outlet end of the same, a relevant cable being introduced into the inlet end. A similar method is known from the European patent No. 0108590. This patent also discloses a device for employing such a method, which device is provided with a cable injection unit with in it a hollow, substantially rectilinear cable lead-through channel with an entrance end and an exit end for leading in and leading out a cable which has to be introduced into the relevant duct, which cable injection unit is further provided with a gas channel, which debouches into the cable lead-through channel and via which compressed gas can be supplied to the cable lead-through channel, as well as with a set of wheels mounted opposite to each other and partly reaching into the lead-through channel, and serving to move on a cable, disposed between these wheels and touching them, in the direction of the exit end. This known technique is meant for installing lightweight, flexible optical fibre cables. The flow of compressed air led through a duct exerts a drag force working on a cable introduced into the duct, due to which such a cable will be dragged through the duct to its outlet end. As appears from this known technique the velocity of the flow of compressed air is practically linearly dependent (increasing) on the difference in pressure there is between the inlet end and the outlet end of a relevant duct portion. The length of the duct portion over which a cable section can be installed at one processing stroke is in this case limited to abt. 200 m, even though it is expected in the above-mentioned patent specification that said length can be extended to abt. 300 m for a cable with a weight of 3 gms/m and when the difference in pressure is abt. 55 psi. The two wheels forming part of a cable injection unit according to the aforesaid patent specification exclusively serve to compensate the opposing forces exerted on the cable and caused by the difference in pressure there is between the interior and the outer environments of the injection unit.

B. SUMMARY OF THE INVENTION

According to what is taught by the invention described in the above-mentioned patent specification it is a requirement that the drag forces caused by the flow of compressed air are active from the inlet end to the outlet end of a relevant duct portion. The object of the present invention is to improve the efficiency of the above-mentioned known technique and to enlarge the possibility of using the same, with due observance of the requirement that it must be possible to install the cable into a channelization system in which curves and/or windings occur.

The consideration which has led to the present invention is based on the fact that the pressure gradient caused in a duct, and consequently the dragging working, is not constant, and, dependent on the length of a relevant duct portion, may be too small to compensate the friction forces exerted on the cable at the beginning of the duct portion. Starting from this consideration a method according to the invention is characterized in that at said inlet end active pushing forces will be exerted on the cable over a certain length of the relevant duct.

A method according to the invention makes it possible to install, at one processing stroke, a cable into a duct portion (with curves and windings) over a length of abt. 700 m by utilizing the cable stiffness of cables, more in particular optical fibre cables, used in practice.

A device for employing the method described above is according to the invention characterized in that one of the wheels is coupled to a piston, which is movably mounted in a pneumatic cylinder, in such a way that when compressed gas is supplied to the pneumatic cylinder, transverse forces will be exerted on the cable disposed between the wheels; and in that one of the wheels is coupled to a pneumatic motor, which is capable of providing a driving couple on the spot where a relevant cable is pressed between the wheels, which driving couple is larger than the driving couple which has to act on the cable to compensate the difference between the pressure inside and the pressure outside the cable lead-through channel.

It will offer an advantage when two or more cable injection units are made to work in tandem connection. For that purpose a device according to the invention is characterized in that the cable injection unit is composed of two parts which are detachably fixed to each other, in such a way that such a cable injection unit can be removed from a cable extending through the same.

For a further improvement of the efficiency a device according to the invention is characterized in that the wheels have a hollow tread, such a tread being provided with knurls substantially running parallel to the axis of rotation of the relevant wheel, due to which the engaging effect on the cable will be considerably improved, also when such a cable is provided with a lubricant and this is a special advantage when employing the tandem method. For in this case a cable covered with a lubricant will arrive at the inlet end of the cable injection unit disposed at the outlet end of a relevant duct portion. In other words, a cable covered with a lubricant will then be led between the wheels.

When utilizing in practice a difference in pressure between the inlet end and the outlet end of a duct of abt. 7.5 bar, the velocity of the flow of compressed air can have reached a very high value at the outlet end (illustrative is a value of abt. 150 m/sec). For reasons of security it has been suggested according to the invention to make use of a coupling unit disposed at the outlet end of a duct portion and (in the case of tandem working) at the inlet end of the next injection unit. Such a coupling unit is characterized by a duct inlet for receiving a duct; by a compressed gas outlet pipe adapted either to lead away a flow of compressed gas coming in via the duct inlet at a high velocity to a place which is safe for operating personnel or to slow down the velocity of such a flow to a safe velocity; and by a cable outlet opening with a lining capable of slowing down particles which may come along with the cable and/or the flow of compressed gas, which outlet opening is covered by a cover plate, which is pivotally mounted on the coupling unit and sucks itself, which cover plate can also be pushed aside by the cable in a simple way.

Summarizing the invention results in the following advantages:
quick and simple installation without the need of a pulling rope;
small cable strain during the installation process;
relatively long length of installation per injection unit; and efficient and simple tandem working, the relevant injection units being capable of working in series with intermediate distances which are practically independent of the route of the channelization system.

C. BRIEF DESCRIPTION OF THE DRAWING

The invention will be further explained hereinafter with reference to the drawing in which FIG. 1 shows a set of diagrammatic representations with the aid of which the essences of the method according to the invention will be explained;

D. REFERENCES

[1] European patent 0 108 590.
[2] "A radically new approach to the installation of optical fibre using the viscous flow of air" by S. A. Cassidy et al. in Proc. IWCS (1983) 250.

E. DETAILED DESCRIPTION OF THE FIGURES

Figure 1:
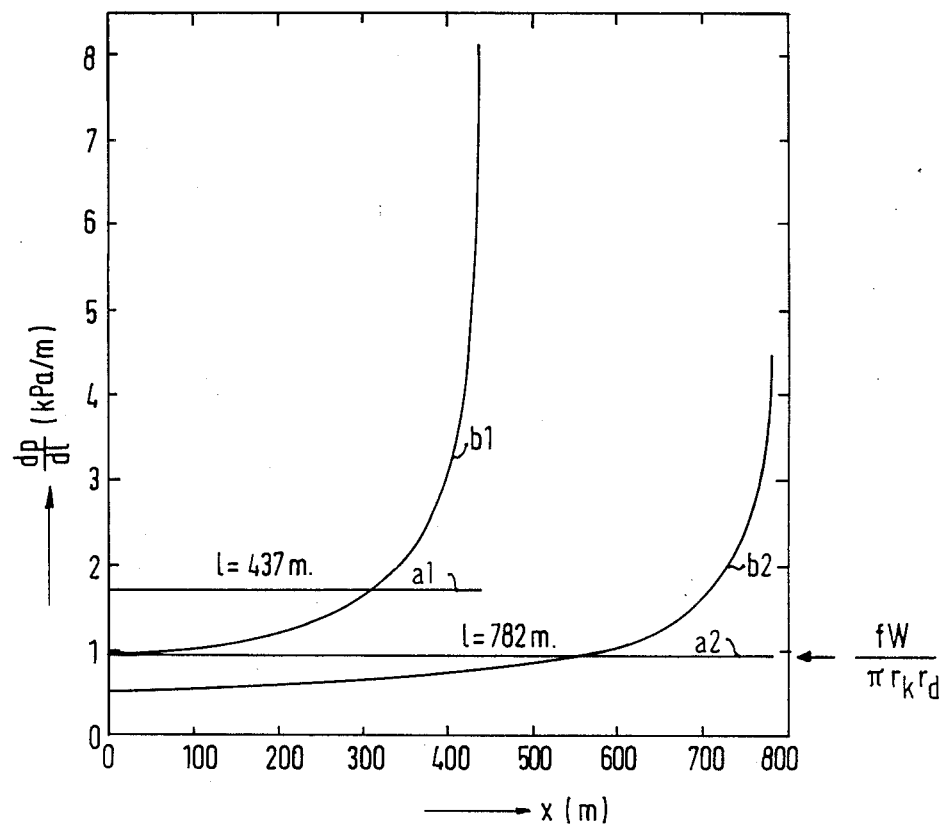

The essence of the method according to the invention will be further explained in the first instance with reference to fIG. 1.

An important consideration underlying the present invention implies that the course of the pressure in a duct portion having a length 1 and a pressure at the beginning respectively the end of this portion of p(o) respective p(l), is a non-linear function of the place (x) and can be represented for an isothermal flow by $$p(x) = p(o) \sqrt{1 - \left(1 - \left(\frac{p(l)}{p(o)}\right)^2\right)\frac{x}{1}} , \quad (1)$$

so that the pressure gradient which is a measure for the dragging working exerted on the cable by the flow of compressed gas can be written as $$\frac{d(p)}{d(x)} = \frac{p(o)^2 - p(l)^2}{2 l p(x)} . \quad (2)$$

It is noted that what is expressed by this formula (2) in fact applies to an "empty" duct portion. When such a duct portion contains a cable, the whole will become considerably more complicated. However, in practice it has appeared that what is expressed by the formula (2) is a useful valuation.

With the aid of the technique described in reference [1] it will be possible to compensate the friction forces, caused by the mass of the cable, locally. According to this known technique it is assumed, and this also appears from reference [2], that the course of the pressure between the beginning and the end of a duct portion is linear. In other words, according to these known techniques the pressure gradient $$\frac{d(p)}{d(1)}$$

considered over the whole length 1 of the duct portion will be constant. It is also derived that the hydrostatic force per unit of length F/1 (dragging working caused by the compressed air blown into the duct portion) can be represented by $$\frac{F}{1} = \frac{d(p)}{d(1)} \cdot \pi \cdot r_k \cdot r_d. \quad (3)$$

Figure 2:
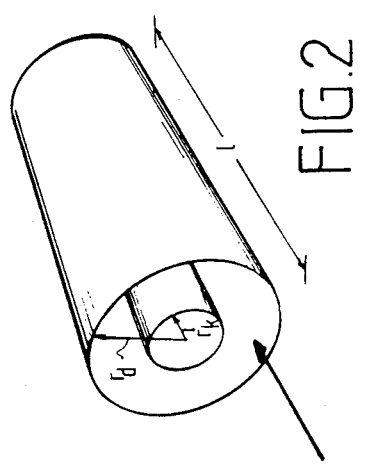
FIG. 2 shows a diagrammatic representation of a duct portion with contained in it a cable section on which a dragging working caused by a flow of compressed gas is exerted.

See in this connection FIG. 2, in which a duct portion with a length 1 and a cable contained in it are diagrammatically shown. The arrow represents the flow of compressed air blown along the cable.

The friction force $$\frac{F_w}{1}$$

to be compensated per unit of length can be represented by $$\frac{F_w}{1} = f \cdot W., \quad (4)$$

in which f stands for the coefficient of friction between the cable and the duct, and W for the cable weight per unit of length.

The diagrammatic representations of FIG. 1 show the course of the pressure gradient $$\frac{d(p)}{d(x)}$$

as a function of the place x along a duct portion, it being assumed that p(o)=8.5 bar and p(1)=1 bar (absolute). The diagrams in this figure are drawn for illustrative duct portions of a length of 437 m respectively 782 m and for a1 and a2 it is assumed that the pressure gradient will be a constant $$\frac{p(o) - p(1)}{1},$$

whereas for b1 and b2 it is thought that the pressure gradient will not be constant according to the formula (2). Moreover, on the basis of the formulae (3) and (4) the arrow on the right indicates the pressure gradient $$\frac{fW}{\pi r_k r_d},$$

which is indispensable to compensate the friction force exerted on the cable (f=0.25; W=0.76 N/m; $r_d$=13 mm; $r_k$=4.85 mm). In the cases a1 and a2, where the pressure gradient is assumed to be a constant, it happens that when the duct length l=782 m, the pressure gradient will just be sufficient to compensate the friction forces, whereas this pressure gradient will be larger than necessary for such a compensation, when the duct length l=437 m.

From the course of the curves b1 and b2, which are illustrative of the formula (2), the following appears:

for the duct length l=437 m the pressure gradient considered over the whole duct portion will always be sufficient and near the inlet unit just sufficient to compensate the friction forces exerted on the cable;

for the duct length l=782 m the pressure gradient considered over a relatively large part of the duct portion will not be sufficient to compensate the friction force exerted on the cable locally.

From the above it can be concluded that the above-mentioned technique will be insufficient to install per injection unit a cable length longer than a certain limiting value, in the aforesaid case 437 m, into a duct. In other words, on the basis of the assumption made in connection with the case a2 and the possible installation length calculated from it, it will not be possible to install a cable into a duct portion with such a length by making use of only a flow of compressed gas. According to the present invention it has now been suggested to exert, from the inlet end of a relevant duct portion and by making use of the stiffness of a cable to be installed, a pushing force working on such a cable. If somewhere in the duct the dragging working of the flow of compressed gas blown into the same is still insufficient to compensate the friction forces, this function will be fulfilled by such a pushing force working. In this way the length of the duct portion over which a cable can be installed by means of only one injection unit can be considerably extended, which is also established by experiment. A factor of two with regard to a known blowing-in technique has proved to be possible. Illustrative of a cable used in practice is a cable with a stiffness of abt. 0.9 $Nm^2$. Such a stiffness will be sufficient to hinder "buckling" of the cable when pushing it into a duct in such a way that the cable will not press itself fixed against the wall to any extent, and on the other hand the friction forces particularly arising consequent on the stiffness of the cable in curves and/or windings in the relevant duct portion still prove to be compensable. By employing the method according to the invention it has proved to be posssible to install a cable into a duct portion with a length of more than 700 m. Briefly summarized the method according to the invention results in the following advantages:

quick and simple installation, small cable strain during the installation process;

considerable extension of the length of installation, which can be effected by means of only one injection unit; and several injection units can be used in series (tandem connection) in an efficient and simple way.

Figure 3:
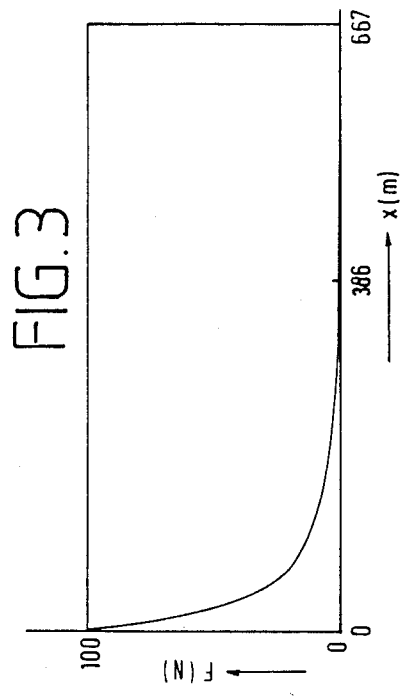
FIG. 3 shows a diagrammatic representation to illustrate the pushing force working which, according to the invention, is exerted on the cable.

Illustrative of the invention is the following example:

The duct portion in this example has a length of 667 m and an inside diameter of 26 mm, and right-angled curves at distances of 150, 250, 400 and 600 m from the cable inlet end, which curves have a radius of curvature of 1 m; moreover, the duct portion has a winding course with a period of 4 m and an amplitude of 5 cm. The cable to be installed has a diameter of 9.7 mm, a weight of 0.65 N/m and a stiffness of 0.9 $Nm^2$. The coefficient of friction between the cable and the inner wall of the duct is 0.25. Compressed air supplied by a compressor with a capacity of 75 l/sec (atmospheric) and a maximum working pressure of 7.5 bar (overpressure) is used for installing the cable. By means of the formula (2) a value of 5.34* $10^8$/p $p_d$/m can be calculated as an estimation for the pressure gradient. Only after 386 m this pressure gradient will be sufficiently large to stop the effective friction force fW of 0.19 Nm (consequent on the existing curves and windings the effective cable weight per unit of length has become larger due to the stiffness of the cable) exerted on the cable locally. The course of the necessary pushing force F has been numerically calculated as a function of the distance x (from the inlet end of the duct portion) as illustrated in FIG. 3. It has appeared that the cable can be installed into the portion in question by means of the combination of such a pushing force working and a flow of compressed air.

For the sake of completeness it is noted that the various negative effects (curves hinder the development of pushing force) and positive effects (moving the position where the pushing force is zero because of the fact that in the part after it the compressed air exerts an effective dragging working) can play a part. Moreover, a change of the geometry can have considerable consequences. For example, if the number of windings and/or curves is decreased, the length of the duct portion into which the cable can still be installed by means of the combination of a flow of compressed air and a pushing force working, will be longer.

Figure 4:
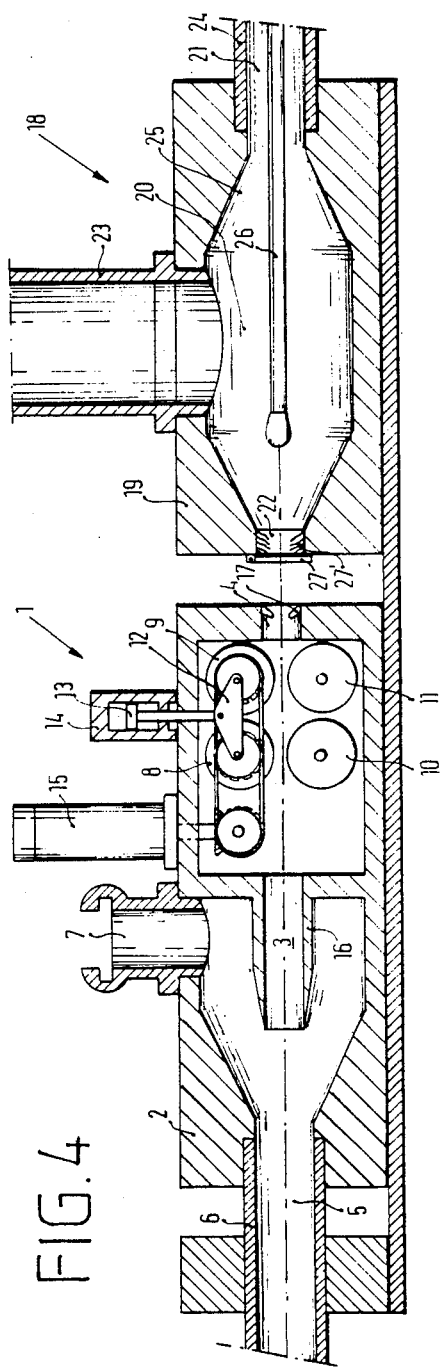
FIG. 4 shows a diagrammatic cross-sectional view of an embodiment which is illustrative of a device for employing the method according to the invention.

FIG. 4 is illustrative of an embodiment of a device for employing the method according to the invention. More in particular FIG. 4 shows a diagrammatic cross-sectional view of such a device. A device of that type or a cable injection unit is in its generality designated by 1. This unit comprises a housing 2, in which a substantially rectilinear cable lead-through channel is formed, which channel has an inlet end 4 through which a cable can be led into the injection unit, and an outlet end 5, which has been adapted to be coupled to a relevant duct 6, into which a cable has to be installed, while at the same time forming a gastight closing. An inlet tube debouching into the lead-through channel and meant to be connected to a source of compressed gas (a compressor which is not shown in the figure) is designated by 7. In the case of a usual flow resistance of the relevant duct portion and a conventional compressor with a capacity of 75 ltr/sec and a maximum working pressure of 7.5 bar (overpressure), a flow of compressed gas (flow of air) in the order of magnitude of 75 ltr/sec will stream via said inlet tube. A set of wheels 8, 9, 10 and 11 is pivotally mounted in a housing and partly reaches into the lead-through channel. The set of wheels 8 and 9 is supported by a frame 12, which is pivotally coupled to a piston rod of a piston 13, which is movably mounted in a pneumatic cylinder 14. As diagrammatically shown in FIG. 4, the two wheels 8 and 9 can be set turning via a transmission mechanism by means of a pneumatic motor 15, which is mounted on the housing. Opposite to the embouchure of the gas inlet tube the cable lead-through channel is bounded by a streamlined small pipe 16, which ensures that the course of a cable disposed in the lead-through channel will remain substantially rectilinear, in spite of the strong flow of compressed gas. In other words, the cable will be prevented from being blown to a "buckling" in that portion, which would seriously hinder the introduction of the cable into the duct. A cable led into the lead-through channel via the inlet opening 4 forms via a diagrammatically drawn washer 17 a gastight closing. In consequence of the compressed air supplied there will be a difference in pressure between the interior and the exterior of the housing. Owing to this a force working will be exerted on the cable disposed in the lead-through channel, which takes the opposite direction with regard to the desired direction of movement of this cable. When compressed air is supplied to the cylinder 14 and to the motor 15, this "oppositely directed" force working will be compensated. A pneumatic motor has the advantage that the driving couple provided by it is proportional to the pressure caused in the housing; moreover, when compressed air is supplied, a pneumatic motor can be slowed down to a standstill without harmful consequences, and also be kept in such a state (if desired for a long time). The latter is a particular advantage when several cable injection units are used in series (or in tandem connection).

Within the scope of the present invention, however, the pneumatic motor is considerably more powerful than necessary for compensating the above-mentioned "oppositely directed" force working. Illustrative is e.g. a motor capable of providing a force working which is thrice as large as the force working necessary for the above-meant compensation. By means of a motor thus dimensioned it will be achieved that over a length area extending over a certain distance from the beginning of the relevant duct portion, a pushing force working is exerted on the cable disposed in the duct. As explained with reference to FIG. 1, such a pushing force working neutralizes the local friction force working, caused by the friction between the cable and the inner wall of the duct, and by the weight of the cable, at those places where the pressure gradient respectively the dragging working caused by the flow of compressed air is still too small to compensate the friction force working referred to. In order to ensure that the pushing force working will be effective, it is essential that the relevant cable has a certain stiffness. The cables used in practice meet this requirement. In practical situations it has appeared that the length of the duct portion over which a cable can be installed by means of only one injection unit, can be extended by a factor of abt. two, when use is made of such a pushing force working. The speed at which the cable is introduced into a duct can be regulated by means of a pressure regulator (not shown in FIG. 4). To promote the engagement between the wheels and the cable to be moved on by them, each of these wheels has a hollow tread, which is provided with transversal knurls. The advantage of such a construction is that said wheels cannot get filled up with material from the cable sheath and pollutants, if any, taken along by the cable, and that slipping, even when the cable sheath is covered with a lubricant, will be effectively hindered.

In the embodiment represented in FIG. 4 two driven wheels and two "counter pressure" wheels are used. However, if need be, also an embodiment with one respectively more than two driven wheels and one respectively more than two counter pressure wheels can be made use of. In the latter case it is advisable to use at least two pneumatic cylinders, each of the pneumatic cylinders operating two wheels at most, which are in this case mounted in a frame, which is pivotally coupled to the relevant piston rod. The pneumatic cylinder/piston combination serving to cause the pressing working has the advantage that in the case of a certain supply of compressed air the pressure force working exerted on the cable will be substantially constant. That means that notwithstanding variations in the thickness of the cable, this pressure force will remain constant. Moreover, an upper limit corresponding to the maximum working pressure of the supply compressor of 7.5 bar, has been set to the pressure force working exerted. This means that the permissible squeezing pressure of a cable used in practice will not be exceeded when using the pneumatic cylinder/piston combination.

By means of the above-described construction the motor can be brought to a standstill by slowing down and bringing to a standstill the cable moved on by that motor.

Figure 5:
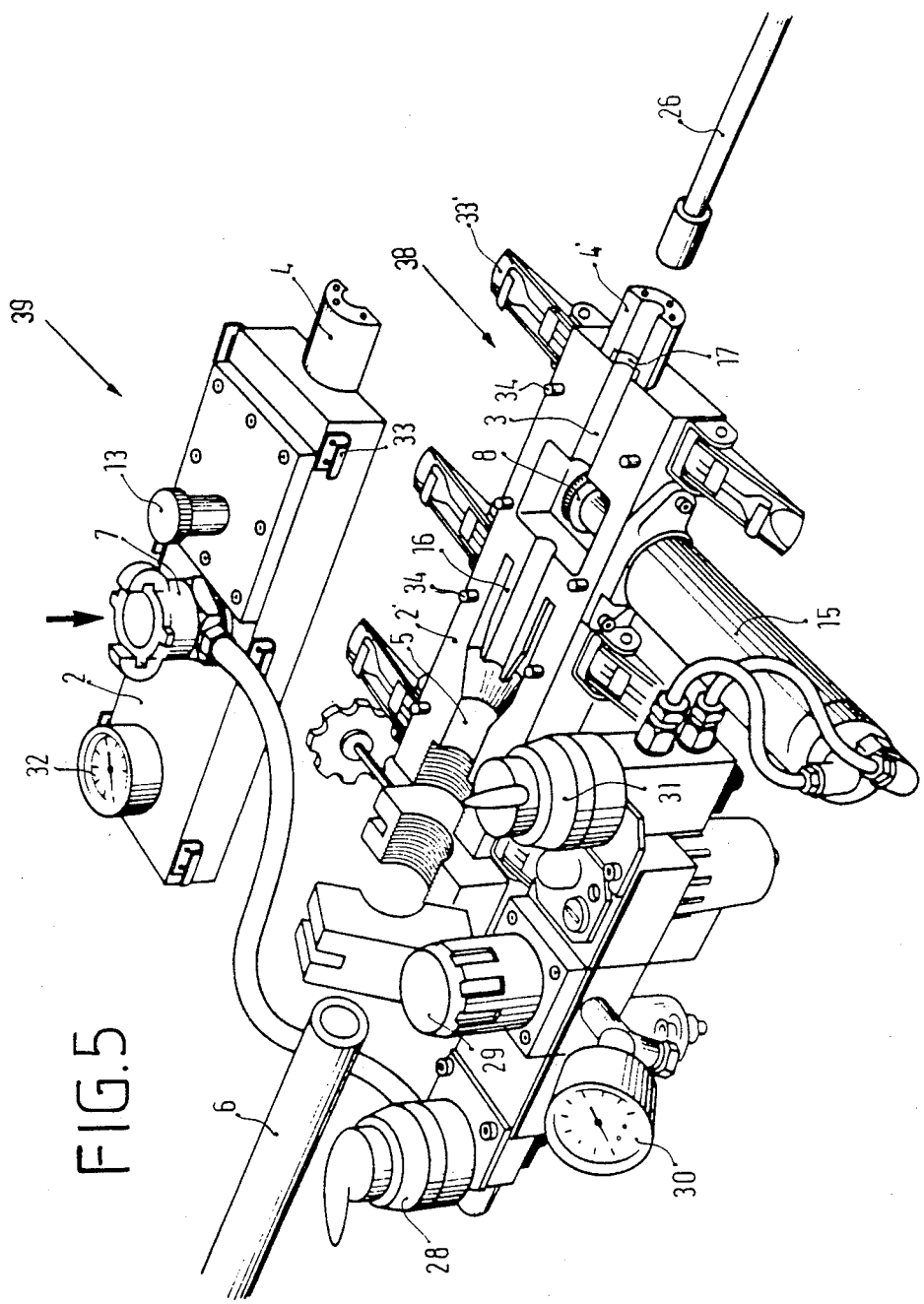
FIG. 5 shows a perspective view of a possible embodiment, taken apart, of a cable injection unit according to the invention.

FIG. 4 also shows a coupling or closing unit 18. Such a unit comprises a housing 19, which leaves space to a room 20, which is connected to the outer environments via an inlet opening 21, an outlet opening 22 and a compressed gas outlet pipe 23. The inlet end has been adapted to form a gastight coupling with the final part of a duct portion 24, at the beginning of which use is made of a cable injection unit similar to the one shown in FIG. 4. The velocity at which the compressed air flows into the room 20 via the inlet end 21 is substantially determined by the magnitude of the flow of compressed air. In the case of values of abt. 7.5 bar and 75 ltr/sec this velocity will be in the order of magnitude of 150 m/sec. For reasons of security and for the protection of an injection unit located near the outlet opening 22 the compressed air outlet pipe has been designed in such a way that the compressed air supplied will be slowed down, via a widening initial part 25, without causing whirls, and led away, via this outlet pipe 23, to a place which is safe for the operating staff. As an alternative said outlet pipe can have been dimensioned in such a way that the velocity at which the compressed air streams out has been reduced to a safe value. The cable 26 installed in the duct portion 24 can be led to the next cable injection unit, in this case the injection unit 1, via the outlet opening 22, which is provided with a lining 27' capable of slowing down quick particles which may come along with the cable and/or the flow of compressed gas. As a rule the opening 22 is closed by means of a valve 27 pivotally mounted on the housing 19, which valve will attach itself firmly to the outside of the housing due to the acceleration of the flow of air there, when there is no cable at that place, in such a way that the valve will offer protection against the particles moving on at a high speed. By means of the cable supplied this valve can be opened, in which case the lining 27' will then fulfil the function of the valve 27. After that this cable can be installed via the injection unit 1 into the duct portion 6, which follows after the duct portion 24. For that purpose the two injection units have to work in series or in tandem. In connection with such a tandem working each cable injection unit and coupling or closing unit which has to be used in that process, has been designed as two parts which are detachably fixed to each other. This is illustrated in FIG. 5, in which these parts 38 and 39 are detached from each other. In this figure the relevant parts are indicated as follows:

2; $2^1$ component parts of the housing;
3 cable lead-through channel;
4; $4^1$ component parts of the inlet end;
5 outlet end (one half of it);
6 duct;
7 compressed air inlet tube;
8 wheel with hollow tread provided with transversal knurls;
13 cable pressure mechanism;
15 pneumatic motor;
16 streamlined pipe (one half of it);
17 recess for one half of a washer;
26 cable;
28 on/off switch compressed air;
29 reducing valve for controlling the speed of the pneumatic motor;
30 pressure gauge for measuring the pressure supplied to the pneumatic motor (indicative of the motor torque);
31 reversing switch for reversing the direction in which the motor runs;
32 pressure gauge for measuring the pressure at the entrance of the duct portion 6;
33, $33^1$ fixing clamps for detachably fixing the parts 38 and 39 to each other;
34 centring bosses.

For the sake of completeness it is noted that in the embodiment according to FIG. 5 the motor 15 drives only one wheel 8, which wheel can co-operate with a wheel (not shown in FIG. 5) mounted in the part 39 opposite to the former wheel. Moreover, the drive mechanism 13 in this embodiment is provided with a pressure spring (not shown in the figure), due to which the latter wheel is pressed against the cable. It is obvious that this pressure mechanism can be replaced by the construction comprising a pneumatic cylinder/piston combination and described in connection with FIG. 4.

The special construction of the wheels described in what precedes makes it possible that a cable disposed between them will be moved on effectively without causing damage to the cable sheath, and no matter whether such a cable sheath is covered with a lubricant or not. The latter is an advantage when the tandem method is employed. For in that case a cable provided with a lubricant is supplied to an injection unit. For a further improvement of the working of the wheels it may be advisable to provide the outer sheath of a cable to be installed with corresponding transversal knurls. These knurls may also result in an enhancement of the dragging working caused by the flow of compressed gas.

We claim:

1. A method of advancing a longitudinal element along a previously installed tubular pathway in situ, said tubular pathway extending between two points, said method comprising
   (a) inserting and advancing the free end of the element into the pathway by applying to said element a force in the direction of insertion;
   (b) inserting a gaseous medium into the pathway with a flow velocity much higher than the desired rate of advance of said element through said pathway; and
   (c) propelling the free end and following portions of the element along the pathway by continuance of said insertion force in cooperation with a fluid drag force of said gaseous medium passed throughout the length of the pathway in the desired direction of advance such that said drag force on the element is distributed throughout the length of said element then present in the pathway,
characterized in that the longitudinal element is a cable with an intrinsic stiffness and that the insertion force is exerted dependent on the intrinsic stiffness of said cable, as an at one point concentrated pushing force which is effective over a main part of the pathway to complete a deficiency in friction forces compensating the effect of said drag force in said main part, said drag force and said pushing force enabling in their cooperation the cable and its advancing free end to be advanced past bends, which may be present in the pathway, without unacceptable pulling or pushing forces being concentrated on any portion of the cable, said gaseous medium having substantially higher velocity than said cable throughout the length of the pathway.

2. A method in accordance with claim 1 characterized in that said pushing force is a few times larger than the force required for overcoming the pressure difference existing at the insertion point of the pathway between the inside and outside of the pathway as a consequence of said insertion of the gaseous medium.

3. A method in accordance with claim 2 wherein forces transversely exerted on the cable are made use of to cause said pushing force, characterized in that for these transverse forces a value has been chosen which is of the same order of magnitude as, but smaller than a transverse force value corresponding with the maximum squeezing pressure permissible for the relevant cable.

* * * * *